Figure 1:
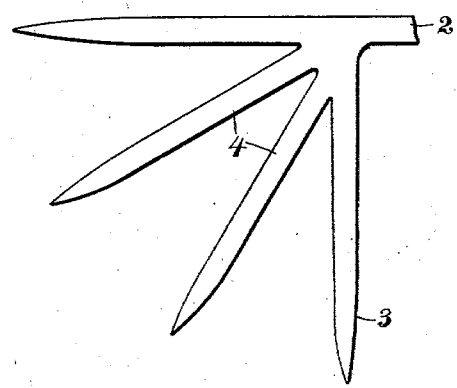

No. 704,719. Patented July 15, 1902.
C. H. TRUMPLER.
RAKE.
(Application filed Oct. 15, 1901.)
(No Model.)

Witnesses:
H. F. Campbell
F. L. Fliedner.

Inventor:
Charles H. Trumpler,
By his Attorney,
F. A. Richards.

THE NORRIS PETERS CO., PHOTO-LITHO., WASHINGTON, D. C.

UNITED STATES PATENT OFFICE.

CHARLES H. TRUMPLER, OF BROOKLYN, NEW YORK.

RAKE.

SPECIFICATION forming part of Letters Patent No. 704,719, dated July 15, 1902.

Application filed October 15, 1901. Serial No. 78,679. (No model.)

*To all whom it may concern:*

Be it known that I, CHARLES H. TRUMPLER, a citizen of the United States, residing in Brooklyn, in the county of Kings and State of New York, have invented certain new and useful Improvements in Rakes, of which the following is a specification.

This invention relates to that form of rake which consists of a bar or head bearing rigid teeth or tines ordinarily arranged at right angles with said bar and parallel to each other, and in the form thereof to which my invention more specifically relates and which is commonly denominated a "hand-rake" to said head or bar is ordinarily attached a handle at right angles to said head or bar and at a greater or less angle to said teeth or tines, as may be necessary to best adapt said rake to the specific use or uses for which it may have been designed. Such uses ordinarily comprise leveling or loosening of the surface of the ground or the collection thereon of loose substances—such as mown grass or hay, dead leaves, or stones, or refuse matter—and involves operations to which it is peculiarly adapted and for which even in its ordinary form it possesses marked advantages over cognate implements—such as hoes, brooms, spades, forks, or brushes—to none of which does this invention appertain. In its ordinary form, however, it is found impossible to functionally operate a rake in some locations in which the necessity for its specific use is plainly indicated—as, for instance, between plants or other objects located so near to each other that the rake head or bar may not pass between them, except at an angle. Under such circumstances it is frequently found necessary to remove objects by hand, especially such as growing weeds, grass, moss, or other objects attached to or fixed in the ground. By the form chosen to illustrate my invention herein, however, such removal may be quickly effected by the use of the rake, which if the head thereof be held vertically or at any suitable angle with the ground may be operated in its functionally peculiar manner. This is effected by means of a tooth or teeth other than those depending vertically from the rake-bar, said teeth or tines being, in fact, disposed at various angles at the respective ends of said rake-bar, so that they severally diverge one from another and from said depending teeth or tines. The divergent teeth are preferably located on a common plane with the pendent teeth and are preferably formed in sets either integral with the rake-head or secured to a member which may be detachably fixed thereon.

A further object of the invention is to provide a tine or tines adapted to be removably attached to an implement of the class described, whereby such implement may be used under varying conditions.

Figure 2:
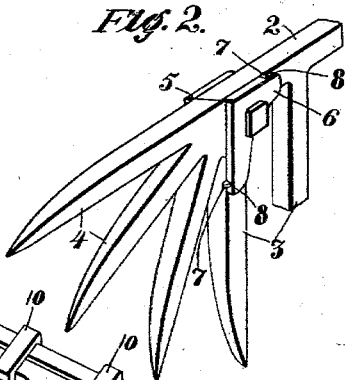
Figure 3:
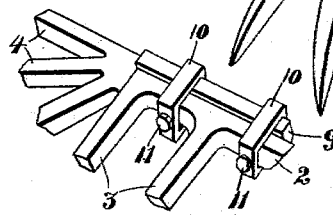
Figure 4:
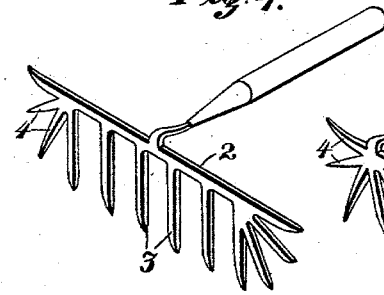
Figure 5:
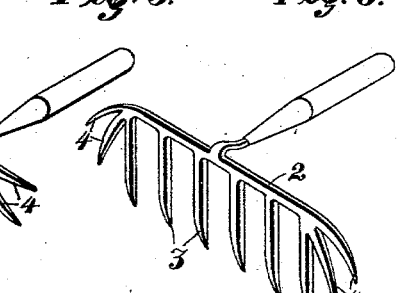
Figure 6:
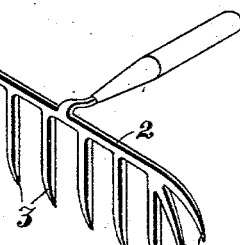
Figure 7:
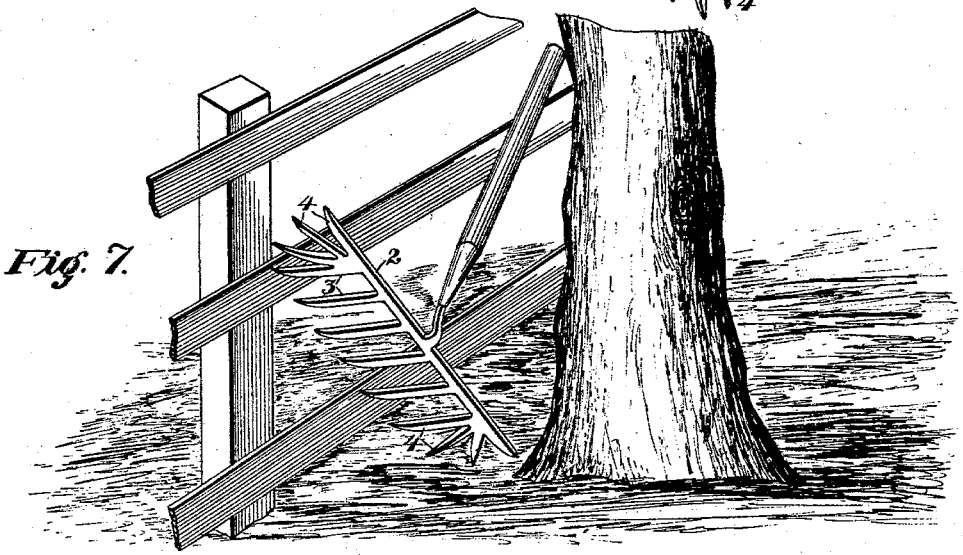

In the drawings accompanying and forming part of this specification, Figure 1 is a view of a part of a rake, showing one form of these improved tines integral therewith. Fig. 2 is a view of a similar set of tines removably secured to an ordinary rake. Fig. 3 illustrates a somewhat different mode of securing a removable set of tines to a rake. Fig. 4 is a view of a rake with a set of tines similar to those shown in Fig. 1 integral therewith at each end thereof. Fig. 5 is a view of an implement with two sets of radial or diverging tines assembled without the intermediate tines. Fig. 6 is a view of a rake with two sets of radial or diverging curved tines, and Fig. 7 illustrates this improved rake in use.

Similar characters of reference indicate corresponding parts in the different figures of the drawings.

Two modes of attachment are shown in the drawings, one of which is illustrated in Fig. 2. The tines 4 have a plate 5, preferably integral therewith, adapted to overlap the end of the rake-bar. A similar separable plate 6 is adapted for attachment to the opposite side of said tines and the bar, being held in position by projections or ribs 7, formed on the tines and the bar and fitting into grooves 8 in such plate, or vice versa, as may be found desirable, such plates and bar being secured by a bolt extending through said plates.

In the mode of attachment illustrated in Fig. 3 the tines are provided with a bar 9, adapted to be secured in position to the bar of the rake by suitable yokes 10 and bolts 11. On loosening the bolts the tines can be detached by withdrawing the bar 9 from the yokes, whereupon the yokes can be removed from the rake-bar, they being open at one point for this purpose. Various other modes of securing the tines to the implement may be used, if preferred. By forming the tines removable from the rake they may be made and sold for attachment to rakes already in use and can also be detached from the rake to permit the latter to be used independently thereof.

In the form shown in Fig. 5 the depending teeth or tines are omitted, two sets of radial or diverging tines being assembled and secured directly to the handle of the rake. It will be understood that these diverging tines or teeth may be formed straight, as shown in Figs. 1, 2, 3, 4, and 5, or curved, as illustrated in Fig. 6, or of any other desired formation.

The various details of construction may be more or less modified as found desirable in practice without departing from the spirit or scope of the invention, which consists, broadly, in providing a rake with teeth or tines projecting in different directions, whereby it will have one or more diverging or radial tines to permit the tool to be used in various positions, and as the implement of my invention comprises, practically, one or more narrow rakes and a comparatively broad rake the latter may, if desired, be made much broader than those ordinarily in use, inasmuch as the ordinary requirement of facility of passage of the rake-bar horizontally between closely-located objects is by my invention rendered wholly negligible.

Having described my invention, I claim—

1. A rake comprising a bar having depending teeth; and diverging sets of teeth removably secured to said bar.

2. A rake comprising a bar, having a set of depending rigid teeth; a set of laterally-diverging rigid teeth; and means for securing said diverging teeth in position.

3. A rake having depending and diverging teeth, one set thereof detachable; and means for attaching the detachable part of said teeth.

4. In an attachment for a rake, a set of divergent teeth, having means whereby they may be attached to an end of the tooth-bar of a hand-rake.

5. A hand-rake, comprising a single set of separated rigid teeth whose points lie in a long row; at one end of said set a small set of separated rigid teeth whose points lie in a short row which extends crosswise of said long row; so that the long row may be employed in ordinary use, and so that the short row may be brought into action by tilting the rake.

6. A hand-rake comprising a single set of separated rigid teeth, whose points lie in a long row; and at each end of said set a small set of separated rigid teeth, the points of each of said small sets lying in short rows which extend crosswise of said long row, so that the long row may be employed in ordinary use, and so that either of said short rows may be brought into action by tilting the rake one way or the other.

7. A hand-rake comprising a single set of separated teeth whose points lie in a long row; at one end of said set a small set of separated teeth whose points lie in a short row which extends crosswise of said long row; so that the long row may be employed in ordinary use, and so that the short row may be brought into action by tilting the rake; all of said teeth lying substantially in the same plane, thereby forming a substantially continuous set of teeth, and the teeth in the short row diverging from one another and from the teeth lying in the long row.

8. A hand-rake comprising a single set of separated teeth, whose points lie in a long row; and at each end of said set a small set of separated teeth; the points of each of said small sets lying in short rows which extend crosswise of said long row, so that the long row may be employed in ordinary use, and so that either of said short rows may be brought into action by tilting the rake one way or the other, all of said teeth lying in substantially the same plane, thereby forming a substantially continuous set of teeth, and the teeth of each of the short rows diverging from one another and from the teeth in the long row.

9. A hand-rake comprising, in combination, a bar, and a plurality of teeth extending therefrom at various angles; and said teeth terminating in a row which extends substantially at right angles to the several teeth.

10. A hand-rake comprising, in combination, a handle; a bar substantially at right angles thereto; a row of substantially parallel teeth depending from said bar and having an angular relation to said handle; and diverging teeth at one end of said row and lying in substantially the same plane as said row; said diverging teeth terminating at successively higher points than the teeth in said row.

11. A hand-rake comprising, in combination, a handle; a bar substantially at right angles thereto; a row of substantially parallel rigid teeth depending from said bar and having an angular relation to said handle; and a plurality of rigid teeth extending from an end of said bar at various angles with said bar and terminating at successively higher points than the teeth in said row.

CHARLES H. TRUMPLER.

Witnesses:
REUBEN S. GOODELL,
C. A. WEED.